United States Patent

Berlin, Jr. et al.

[11] 4,229,680
[45] Oct. 21, 1980

[54] LAMP LIFE EXTENDER

[75] Inventors: Donald M. Berlin, Jr., McHenry; Clifford E. Mensing, Glen Ellyn, both of Ill.; Ole K. Nilssen, 1984 Caesar Dr.-Rte. 4, Barrington, Ill. 60010

[73] Assignee: Ole K. Nilssen, Barrington, Ill.

[21] Appl. No.: 41,649

[22] Filed: May 23, 1979

[51] Int. Cl.³ .......................................... H05B 37/02
[52] U.S. Cl. .............................. 315/200 R; 307/146; 357/76; 357/79; 315/71
[58] Field of Search ............... 315/200 R, 200 A, 71; 307/146

[56] References Cited

U.S. PATENT DOCUMENTS

| 3,062,986 | 11/1962 | Fritz et al. | 315/200 R |
| 3,215,891 | 11/1965 | Fritz et al. | 315/200 R X |
| 3,450,893 | 6/1969 | Munson | 315/200 R X |
| 3,617,766 | 11/1971 | Kahn | 315/200 R X |
| 3,818,263 | 6/1974 | Belko | 315/200 R X |
| 3,823,339 | 7/1974 | Borneman et al. | 315/200 R X |
| 3,963,956 | 6/1976 | Beining | 315/71 |

Primary Examiner—Alfred E. Smith
Assistant Examiner—Charles F. Roberts
Attorney, Agent, or Firm—McCaleb, Lucas & Brugman

[57] ABSTRACT

A thin disc-like device for attachment to the base end of an incandescent light bulb to provide an auxiliary voltage reducing circuit interfaced between the central base contacts of the light bulb and its cooperating lampholder for purposes of extending the rated life of the light bulb. The device is made up of a generally annular insulator base, which protectively houses, locates and mounts a laminated contact assembly made up of a pair of registeringly disposed brass or copper foil electrical conductor contact plates separated by an intervening sheet insulator; the conductor plates having interfacial soldered connections with an interposed flat leaderless silicon rectifier chip. A compressible annular mounting gasket is adhesively secured to the upper side of the contact assembly, its base housing and the base of the light bulb. The uppermost contact plate is engageably exposed to the base contact of the light bulb while the lowermost contact plate is likewise exposed to the base contact of the lampholder in operation. Axial separation of the bulb and lampholder base contacts is limited to the thin laminated thickness of the contact plates and separating insulator so as to normally maintain the conductor base shell of the light bulb within the upper limits or outer end of the lampholder in operation. An auxiliary insulator shield is optionally provided to further protect the user from contacting "live" metal of the bulb's base shell, due to inconsistency of bulb manufacture resulting in variations in the length or extent of the bulb bases.

23 Claims, 6 Drawing Figures

U.S. Patent    Oct. 21, 1980    Sheet 1 of 2    4,229,680
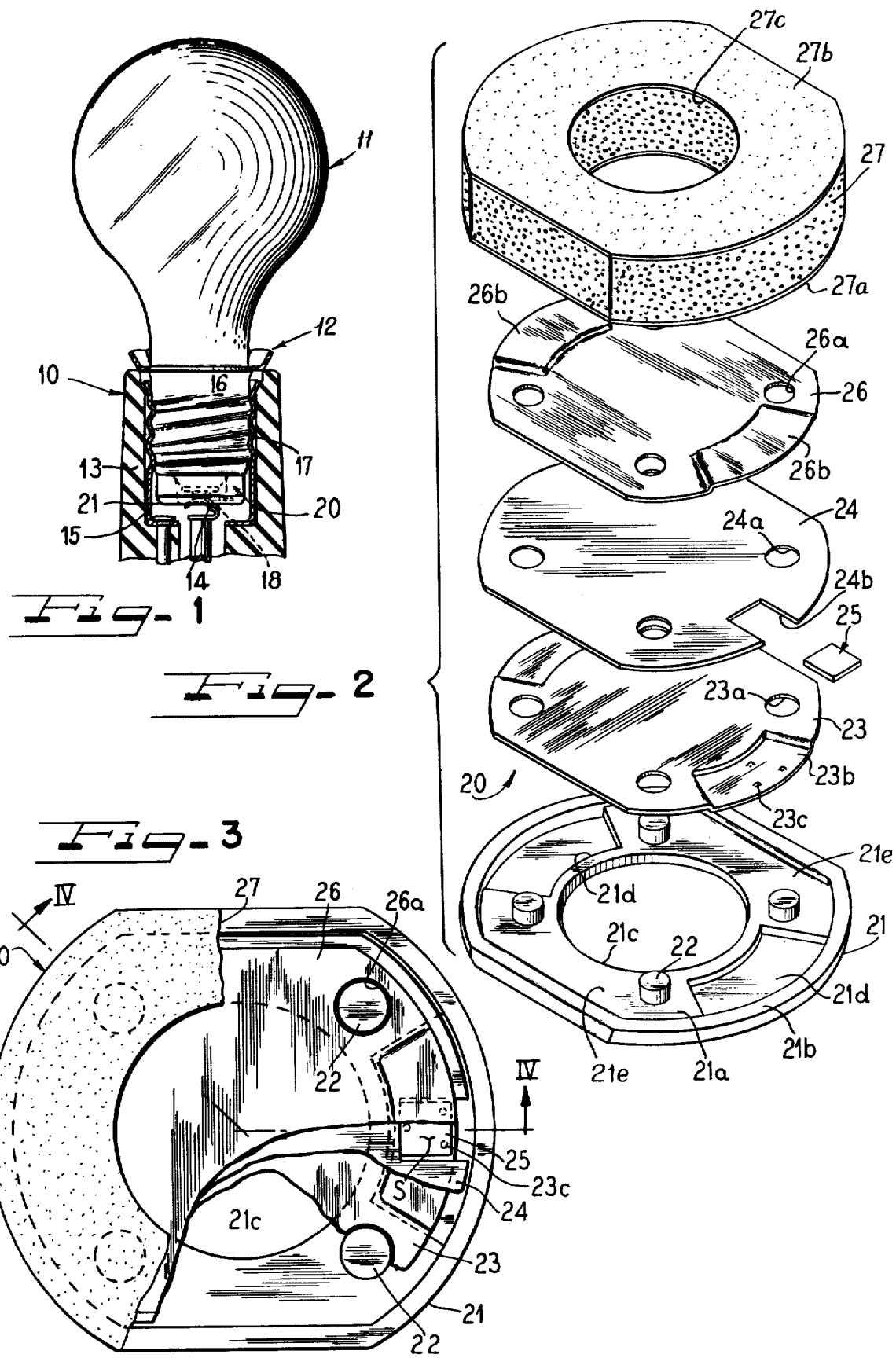

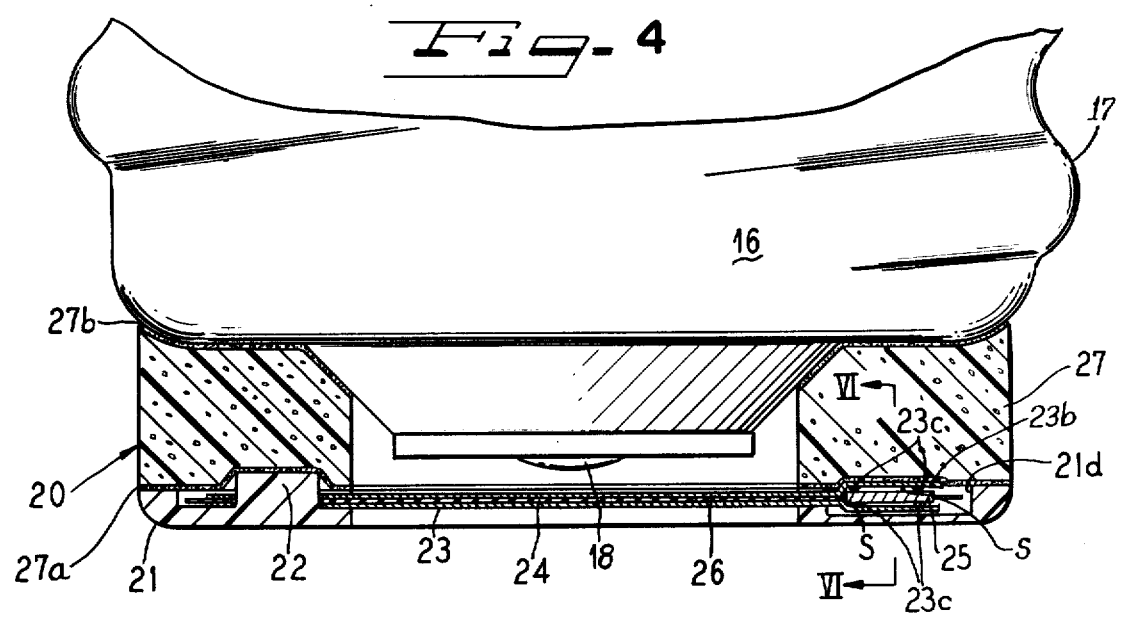
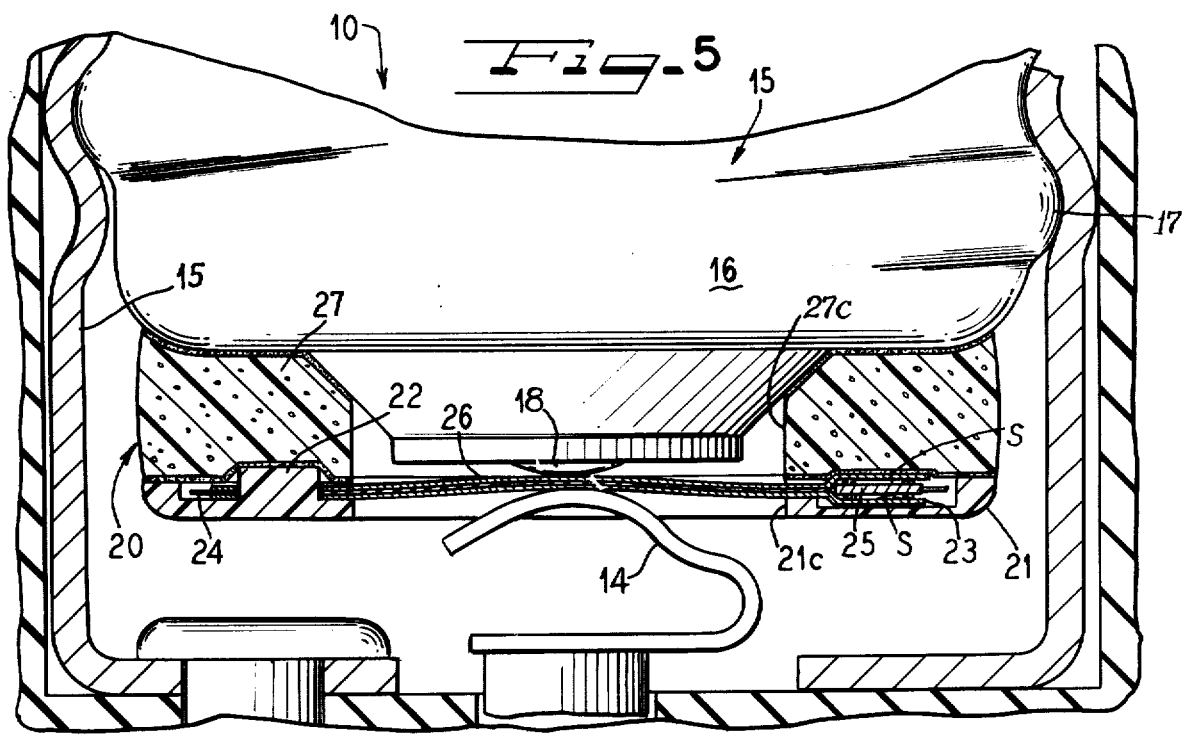
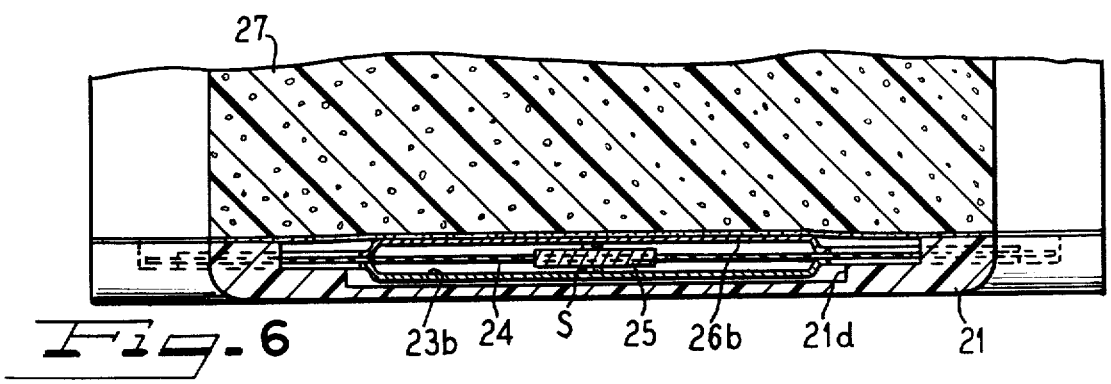

LAMP LIFE EXTENDER

BACKGROUND OF THE INVENTION

Various devices have been presented in the past to interface between a light bulb and its lampholder for the purpose of extending the rated life of the incandescent bulb.

One such currently available device comprises a relatively large (2¼" long × 1¼" diameter) insulator adaptor threadingly mounted into the lampholder and into which the lamp bulb is threaded. A rectifying diode circuit is provided within the casing or housing of this adaptor, but because of its large and cumbersome size this type adaptor has only limited application. Another type of bulb saver or extender is formed as a circular disc of a substantially ⅛" thickness which is freely dropped or inserted into the lampholder socket; the light bulb being threaded into the lampholder socket over the adaptor. The device employs a standard diode having lead conductors in contact with the center contacts of the light bulb and lampholder socket. Because of its relative heavy thickness, the live or energized shell of the light bulb base is exposed beyond the upper end of the lamp socket endangering the user to shock hazards.

Still, another bulb extender device employs a silicon rectifier mounted in the center of an approximately 1" diameter insulator carrying soldered faces for engagement with the central contacts of the socket and light bulb. The device is freely inserted into the lampholder socket and the light bulb is threaded thereinto in normal manner. Because of the central positioning of the diode chip, threading the bulb into the socket often breaks the diode and the device fails.

In general, such previous known devices have been subject to criticism and non-acceptance because of cumbersome design and limited application, or because their thickness causes the light bulb to extend out of the lampholder sufficiently to expose the bulb's live metal case to the user. Devices which are inserted into the lampholder socket also expose the user to shock hazards when installing the device, particularly if the lampholder is energized. In still other instances, criticism has been encountered because of the inability of the devices to withstand relatively high operating temperatures (in the nature of 200° centigrade), encountered in some applications.

SUMMARY OF THE INVENTION

The present invention relates generally to incandescent lamps or light bulbs and more particularly, to auxiliary devices for extending their useful or rated life.

In brief, the present invention seeks to overcome, avoid or minimize the above outlined difficulties prevalent in previous devices of the general class to which this invention pertains. To that end, the device of this invention is designed to be attached to the base end of the light bulb by means of an adhesively coated, compressible gasket means, capable of tightly adhering to and conforming to the general contours of the light bulb base in surrounding relationship to the central contact thereof. The gasket is also utilized to position, maintain and mount appropriate contact means comprising a plate contact assembly in opposing contactable relationship with the central contacts of the light bulb and lampholder socket; the contact assembly being entrapped in a high temperature, molded plastic base housing of generally annular configuration. The entire assembly is a laminated structure comprising the compressible mounting gasket, the contact assembly and insulator base therefor. The contact assembly itself comprises a pair of very thin disc-like, electrically conductive contact plates, separated by an intervening film of non-conductive material and formulated to provide a protective mounting cavity for a leaderless planar faced diode chip which is facially soldered to and between the opposing faces of the conductive contact plates in a protective location disposed laterally or radially outwardly of the central areas of the two contact plates. The device when attached to the base end of the light bulb is threadingly mounted into the lampholder socket simultaneously with the light bulb. In operation, a central area of one contact plate is disposed for engagement with the central contact of the light bulb and the other contact plate is likewise disposed for engagement with the central contact of the lampholder. Due to the thinness of the laminated contacts, at their areas of engagement with and between the bulb and lampholder central contacts, there is very little hazard, if any, of exposing the metal case or shell of the light bulb beyond the upper end of the lampholder socket. The silicon rectifier chip or diode is purposely designed to have comparatively large contacting surfaces with the plate contacts to promote reliable operation at high temperatures while the employment of adhesive means for securing the device to the base end of the light bulb greatly promotes user safety and convenience. The adhesive means is such that attempted removal of the device from the base of a light bulb normally causes its destruction; thereby discouraging its reuse in an undesirable manner, such as by its insertion into the holder socket.

One of the principal objects of this invention is to provide a simple, operationally effective and reliable device for extending the normal rated life of an incandescent light bulb.

A further object of this invention is to provide a device for extending the life of an incandescent bulb, as aforesaid, which is secured to the base end of the light bulb and which is operationally mountable in the bulb's lampholder socket simultaneously with the mounting of the light bulb therein.

Still another important object of this invention is to provide an improved lamp life extender which promotes optimum user safety and convenience.

A still additional object of this invention is to provide an improved lamp life extender characterized by compact and unitary construction; the simplified arrangement of elements affording economies of manufacture.

Another object of this invention is to provide an improved device for extending the normal rated life of an incandescent light bulb which is capable of reliable operation at elevated temperatures without sacrificing operational reliability of the product.

A further important object of this invention is to provide an improved device for extending the rated life of an incandescent light bulb which is interfaced directly between the central contacts of the light bulb and its cooperating lampholder socket to couple the same in series with a voltage reducing circuit.

Another object of this invention is to provide an improved device for extending the useful life of an incandescent light bulb which is operationally disposed between the central contacts of the light bulb and its cooperating lampholder socket without exposing the user to the live metal shell case of the bulb base in operation.

Still, another object of this invention is to provide an improved device for extending the operating life of an incandescent light bulb and which is attached thereto in such a manner that its attempted removal normally leads to destruction of the device thereby aborting its use in an unintended manner.

Having thus described this invention, the above and further objects, features and advantages thereof will be recognized by those of normal skill in the art from the following detailed description of a preferred embodiment of the invention illustrated in the accompanying drawings and representing the best mode presently contemplated as to enable those of skill in this art to make and practice this invention.

IN THE DRAWINGS

FIG. 1 is a side elevational view of a typical light bulb and its cooperating lampholder in assembled combination with a lamp life extender of this invention; portions of the lampholder being shown in fragmentary cross-section;

FIG. 2 is an exploded perspective view of the lamp life extender illustrated in FIG. 1;

FIG. 3 is an enlarged plan view of the assembled lamp life extender with portions broken away to show the assembled relationship of elements;

FIG. 4 is an enlarged fragmentary elevational view of the base end of the light bulb in assembly with the life extender which is shown in cross-section taken substantially along vantage line IV—IV of FIG. 3;

FIG. 5 is an enlarged fragmentary cross-sectional view, similar to FIG. 4, and illustrating the components of FIG. 4 in assembly with a lampholder; and FIG. 6 is an enlarged fragmentary cross-sectional view taken substantially along vantage line VI—VI of FIG. 4 and looking in the direction of the arrows thereon.

THE PREFERRED EMBODIMENT

Turning now to the particulars of the preferred embodiment of this invention illustrated in the accompanying drawings, initial reference is made to FIG. 1 which demonstrates the relationship of a conventional lampholder 10 in assembly with a typical Edison style, Tungsten filament, incandescent light bulb 11 fitted with a safety shield 12 and a lamp life extender 20 in accordance with this invention.

The lampholder 10 comprises a generally cylindrical socket base 13 of ceramic, hard plastic or other electrical insulator material, equipped with a centrally disposed resilient, electrically conductive base contact 14 and a fixed cylindrical metal sleeve contact 15 formed with internal threads and cooperatively receptive of the base of the light bulb.

The light bulb 11 is provided with a base shell conductor 16 formed with external threads 17 thereabout for threaded engagement with the sleeve contact 15 of the lampholder. A central base contact 18 is disposed at the outermost end of the base shell in operative alignment with the central base contact 14 of the lampholder, all in accordance with familiar practice.

The safety shield 12, comprises a simple frusto-conical annulus or ring of pressed, molded or otherwise formed electrical insulator material, preferably a flexible sheet material such as Du Pont Nomex 410. As shown, shield 12 is mounted about the neck of the light bulb 11 in overlying relation to the upper end of the lampholder base 13 to provide an insulated barrier covering the electrically conductive sleeve contact 15 and the base shell 16 of the light bulb. This shield is provided as a precautionary measure to insure the user's safety by preventing any possible contact with the "live" metal of either the lampholder's sleeve contact 15 or the shell base conductor 16 of the light bulb. The need for shield 12, while precautionary, is dictated by inconsistent bulb manufacturing practices which result in variations of the base shell length. Normally, there is very little likelihood that a device 20, in accordance with this invention, will expose the user to "live" metal of the bulb's base shell 16 because of the very thin nature of its contact assembly, as will appear presently.

Turning now to the particular features of the lamp life extender device 20 of this invention, its features will best be understood with reference to FIG. 2 of the drawings which shows the various components and elemental portions thereof in exploded perspective.

Specifically, device 20 comprises a high temperature molded, synthetic plastic and generally annular or ring-shaped mounting base housing 21, slightly smaller in diameter than the bulb's base shell 16. Housing 21 is desirably made from a suitable self-extinguishing, moldable plastic, such as commercially available "Valox" 420, manufactured by General Electric. Housing 21 is an electrical insulator provided with a recessed cavity 21a in the upper side thereof; such cavity being peripherally bordered by a raised annular rim portion 21b and distinguished by a central opening 21c of generally circular or cylindrical formation of a diameter sufficient to permit free passage of the lampholder base contact 14 in operation (see FIG. 5).

Formed on diametrically opposite sides of the cavity 21a and extending substantially from the central opening 21c to the peripheral rim 21b, are a pair of arcuate-shaped, depressed planar areas forming sockets 21d, the purpose of which will appear presently. Base 21 is further distinguished by a plurality (4 in the illustrated case) of upwardly projecting and symmetrically disposed locating pins 22, of generally cylindrical formation which project outwardly from planar plateau portions 21e extending between the two depressed sockets 21d. It will be noted from FIG. 5, for example, that the upper ends of the locating pins 22 are coplanar and aligned at elevations slightly above the upper edge of the peripheral rim portion 21b for the base 21.

Superimposed over the base mounting 21 and mounted within the cavity 21a thereof is a unified and laminated contact assembly comprising a first electrically conductive contact plate 23, a plate insulator element 24, a diode chip 25 and a second electrically conductive contact plate 26, as will now be described and discussed in detail.

The first contact plate 23 is formed as a unitary plate element from very thin (0.004 to 0.005" thickness) copper or brass foil stock to present a peripheral contour generally conforming to, but slightly smaller than the central depressed cavity 21a presented by the open upper end of the insulator mounting base 21. As best shown in FIGS. 2 and 3, the planar body of the contact 23 is provided with four symmetrically disposed circular openings 23a which are located to registeringly receive the upwardly projecting locating pins 22 of the base housing in assembly; such openings 23a being of slightly larger diameter than the diameter of pins 22. The planar body of contact plate 23 is further distinguished by a pair of diametrically opposed, planar depressions 23b of arcuate formation extending inwardly from the outer periphery thereof and corresponding to the arcuate shaped socket areas 21d of the base housing. It will be recognized that such depressed or off-set areas 23b are operationally aligned with and disposed in the socket areas 21d with minimal peripheral clearance. Each of the areas 23b is provided with a plurality, (preferably three), small upset dimples 23c which extend outwardly therefrom to promote soldered connection with the diode chip 25, as will be described in greater detail hereinafter.

Turning now to the features of the insulator element 24, such preferably is cut or stamped from suitable sheet like insulating material, such as Mylar or Nomex, having a thickness in the order of 0.002 to 0.005 inches, although other equivalent materials may be utilized for this purpose in the disclosed device. Insulator element 24 is contoured in general conformity with the periphery of the cavity 21a at the upper end of the base housing; the same being slightly larger than contact plate 23 so as to slightly overhang the outer periphery of the latter in its superposed assembly therewith. (See FIG. 3). It will be noted from FIG. 3, in particular, that while the insulator element 24 extends beyond the peripheral limits of the underlying contact plate 23, it is dimensioned to fit closely within the peripheral confines of the rim portion 21d, surrounding the central cavity of the base housing 21, with only slight clearance. As with the formation of the contact plate 23, the insulator element 24 is provided with four locating pin openings 24a, for closely receiving the upwardly projecting locating pins 22 in assembly. It will be understood, of course, that openings 24a align coaxially with the openings 23a in the underlying contact plate 23.

In addition to such locating openings 24a, insulator element 24 is also provided with a cut-out portion 24b at one peripheral margin thereof, which is herein illustrated to be of generally rectangular formation; the size and shape of the cut-out 24b being such that its edges closely engage corresponding edges of a rectangular shaped rectifier chip 25 to provide close nesting assembly therewith.

The silicon rectifier chip or diode 25 is suitably formed as a regular rectangular parallelopiped having relatively large upper-lower surfaces which are pre-solder coated with high temperature solder, as indicated at S in FIGS. 3, 4 and 5. Typically, a diode chip suitable for the herein described purposes is substantially 0.010 inches thick, 0.100 inches square and has a rating of 3 amps in normal duty cycle. Chip 25 is assembled to and between the contact plates 23 and 26, specifically within the marginal cut-out portion 24b of the insulator element to align the same for soldered connection with the superposed electrically conductive plate contacts 23 and 26, as will appear presently.

The second contact plate 26 bears a construction identical to the contact plate 23 heretofore described and therefore, will not be dwelled on at any great length herein. However, it will be noted that contact 26 is provided with four location holes 26a and a pair of diametrically opposed depressed areas 26b corresponding to areas 23b of the first described contact plate 23. It will be understood that the formation, size, material and other features of the second contact plate 26 are identical in all respects to those of the above described plate 23, except that plate 26 is reversely positioned in registering operational assembly with and over plate 23 and the intervening insulator element 24. Like contact plate 23, the depressed areas 26b of the contact 26 are provided with three small dimpled areas 23c corresponding to the first described dimples 23c.

In assembling the two contact plates 23 and 26, the intervening insulator element 24 and diode 25, corresponding off-set portions 23b and 26b of the two contact plates are opposingly aligned in facial contact with the intervening diode chip 25. The dimples 23c engage the high temperature solder on the opposing faces of the chip to assist in locating the diode chip and permit free flow of the solder in bringing about a soldered connection or integration of the chip with the two contact plates. The contact assembly so formed provides one half sign wave rectification circuit from one plate contact through the chip to the second contact plate. When this rectifying circuit assembly is placed in circuit between the central contact 14 of the lampholder and the central contact 18 of the light bulb, the normal household energy supply of 120 volts is decreased to substantially 84 volts which materially increases the operating life of the bulb filament by lowering its operating temperature, with slight decrease (approximately 40%) in illumination intensity.

In order to provide a simple and expedient means for securing the contact assembly and base 21 to the base end of the light bulb 11, a resilient mounting gasket 27 is provided; such being formed as an annulus conforming to the peripheral contour of the mounting base 21. Gasket 27 has its upper and lower surfaces covered with adhesive layers 27a and 27b and is provided with a central cylindrical opening 27c for passage of the central base contact 18 of the light bulb (see FIG. 4).

Typically, the resilient body of gasket 27 is in the order of ¼ inches thick and is selected from material which will not melt, flow or burn at performance levels of up to 200° C. In addition, the material should have a set of not more than 50% when compressed to a thickness of 1/16 of an inch. A typical material suitable for this purpose is foam silicone rubber or equivalent thermo-foam materials.

The adhesive layers or surfaces 27a and 27b likewise are selected of a material which will not peel or loosen in use and which is capable of withstanding operating temperatures in the order of 0°–200° C. Such, for example, may comprise an acrylic adhesive system. More specifically, the lowermost adhesive layer 27a is utilized to secure the lower face of the gasket in laminated assembly with the uppermost plate contact 26, the upper or outer ends of the locating pins 22 and the peripheral rim portion 21b of the mounting base 21. When the contact assembly comprising the plate contacts 23,26, insulator element 24 and diode chip 25, is mounted as described between the gasket 27 and the mounting base 21, the contact assembly is securely entrapped in the cavity 21a of the base, with contacts 23 and 26 fully isolated from the user except for the central areas thereof opposite opening 21c and 27c through which the central contacts of the light bulb and the lampholder extend in operation.

The upper adhesive layer or surface 27b of the gasket serves to adhesively bond the device 20 to the under side of the light bulb base (see FIGS. 4 and 5); the gasket resiliently conforming to the configuration of such base, concentrically about the central contact 18 thereof which extends downwardly through the central opening 27c of the gasket in near proximity to the exposed upper face of contact plate 26 (see FIG. 5). In practice, the upper adhesive layer 27b is covered with a removable resist such as wax paper, which is peeled off for application of the device 20 to the light bulb.

Importantly, the "adhesive" layers of the gasket are securely mated with the foam body so that when device 20 is attached to the base end of the light bulb it will not easily fall off or loosen when installing or removing the bulb. Once the gasket is installed, its compression and the ambient heat of the energized bulb and lampholder socket serve to "cure" the adhesive to form a stable bond with the engaged surfaces of the light bulb base and the aforemoted portions of the base 21 and plate contact 26. This bonding action may be considered to be relatively permanent in nature since when the light bulb burns out the device 20 normally cannot be removed from the bulb without destruction. This feature is further enhanced by the tendency of the foam gasket material to pull apart or crumble after prolonged exposure to heat.

It will be noted that while the device 20 herein has been illustrated in the form as an annulus of diameter slightly smaller than the base shell of the light bulb with straight parallel sides cut away to minimize use of material and assist in the automatic assembly of parts, such may be of round, oblong or of other suitable shape, as required. Also, while the device 20 is herein described in association with a conventional medium base, Edison style light bulb, the same may be constructed for use with other sized light bulbs, such as Mogal, miniature candleabra and the like.

Having set forth that the features of the various operating elements comprising a lamp life extender device of this invention, its use and operation will best be understood with reference to FIG. 5 of the drawings which illustrates its typical operational arrangement between the base end of the light bulb and the central contact of the lampholder. As shown, the central areas of the two plates 23 and 26 are located in opposing contactable relationship between such two central contacts of the bulb and lampholder so that when the light bulb is fully threaded into the lampholder socket, the central contact 14 of the lampholder is slightly flexed downwardly and the central laminated area of the contact assembly is bent or flexed slightly upwardly, to provide good circuit engagement with and between the central contacts 14 and 18. (See FIG. 5). In this operating condition, the rectifying circuit provided by the contact assembly is in series between the electrical supply source and the filament of the incandescent bulb. It also will be noted that in such contacting condition, as illustrated in FIG. 5, the gasket 27 is under slight axial compression which promotes the permanent bonding of its adhesive layers under the heat and compression of operation, as above explained.

In keeping with the objectives of this invention, it will be recognized that the diode chip 25 is significantly located in a protected zone laterally to one side and remotely of the areas of contact of the extender device with and between the central contacts of the light bulb and lampholder. This avoids cracking or destruction of the diode chip, as encountered in previous devices of this general character in which the diode is mounted between the central contacts of the bulb and lampholder and thus subjected to the contact pressure therebetween. It is of further significance that by employing thin metal foil contact plates 23 and 26 and a thin intervening insulator element 24, to provide an aggregate laminated thickness of substantially 0.010 inches for the contact assembly, very little if any, significant change in the axial positioning of the bulb within the lampholder socket takes place in operation. Consequently, there is minimal likelihood of the "live" shell contact 16 of the lamp bulb being exposed beyond the upper end of the lampholder by virtue of device 20. This, of course, promotes user's safety. Nevertheless, as previously mentioned, the safety shield 12 is optionally employed as a further safety precaution.

From the foregoing, it is believed that those familiar with this art will readily recognize and appreciate the novel advancement of the current invention over prior known devices of the general class to which the same pertains and will understand that while the present invention herein described and disclosed in association with a preferred embodiment thereof, illustrated in the accompanying drawings, the same is susceptible to variation, modification and substitution of equivalents without departing from its spirit and scope. Consequently, it is intended that this invention be unlimited by the foregoing, except as may appear in the following appended claims:

The embodiments of the invention in which an exclusive property or privilege is claimed are defined as follows:

1. A device mountable about the base end of an incandescent light bulb for movement therewith into and out of a lampholder socket and operable to provide a voltage reducing circuit between the central base contacts of the light bulb and lampholder comprising: a thin, disc-like laminated contact assembly providing the voltage reducing circuit and consisting of a pair of thin metal contact plates, thin insulator means separating said plates, and a thin semiconductor rectifier chip electrically connected to and located between peripheral portions of said plates.

2. The combination of claim 1, and a rigid insulator ring protectively encasing the periphery of said plates.

3. The combination of claim 1, wherein the laminated thickness of said plates and insulator means is in the order of 0.010 inches.

4. The combination of claim 1, and a resilient mounting ring attached to and extending outwardly of one side of said assembly and including adhesive means for providing bonded connection thereof with the base of the light bulb, said ring concentrically surrounding the base contact of the light bulb and having sufficient resiliency to conform to the exterior contour of the light bulb base when attached thereto.

5. The combination of claim 4, wherein said adhesive means is curable under ambient heat generated in the lampholder socket during operation, to permanently bond the device to the base of the light bulb.

6. The combination of claim 4, wherein said ring is adhesively bonded to said contact assembly.

7. A device mountable about the base end of an incandescent light bulb for movement with the same into and out of a lampholder socket and operable to provide a voltage reducing circuit between the central base contacts of the light bulb and its cooperating lampholder comprising: a thin, disc-like laminated contact assembly providing the voltage reducing circuit and comprising first and second coextensively superposed, thin metal contact plates; insulator means disposed between and electrically isolating said plates, and a leaderless silicon rectifier chip mounted between and facially connected to registeringly superposed, and oppositely off-set areas formed in corresponding peripheral margins of said plates; an annular mounting base of insulator material having a recessed cavity extending inwardly of one face thereof and formed to substantially registeringly mount said contact assembly therewithin; an annular, compressible mounting gasket of insulator material disposed registeringly over and connectively secured to said base and contact assembly; said gasket having an adhesive coating over an outer end face thereof for bonding the device concentrically about the base of the light bulb so that the central base contact thereof is positioned within the open center of said gasket for operating engagement with said first contact plate.

8. The combination of claim 7, wherein said contact assembly is protectively entrapped between said mounting base and gasket with central areas of said first and second contact plates opposite the open centers of said mounting base and gasket exposed for operational engagement with the central base contacts of said bulb and lampholder socket, respectively.

9. The combination of claim 7, wherein the aggregate laminated thickness of said contact assembly available for engagement by and between said base contacts is substantially 0.010 inches.

10. The combination of claim 7, wherein said gasket is adhesively laminated to said contact assembly and said mounting base.

11. The combination of claim 7, and locating means for registeringly aligning said contact assembly coaxially of said mounting base.

12. The combination of claim 11, wherein said locating means comprises a plurality of spaced locating pins extending integrally upward from the bottom of said cavity, and coaxially aligned spaced openings in said plates and insulator means which are registeringly receptive of said pins in assembly.

13. The combination of claim 7, in which said rectifier chip is facially soldered to said areas; each of said areas being planar and provided with a plurality of spaced projecting dimples engageable with said chip to promote soldered connection therewith.

14. The combination of claim 7, and a rim portion bordering said cavity to protectively surround said assembly.

15. The combination of claim 7, wherein said base is molded of high temperature, self-extinguishing plastic.

16. The combination of claim 7, wherein said insulator means facially engages said plates and extends between said off-set areas thereof; the same having a marginal cut-out portion, the edges of which closely embrace corresponding edges of said rectifier chip to maintain the same in position for soldered connection with said plates.

17. A device mountable about the base end of an incandescent light bulb for extending the operating life thereof by providing an auxiliary voltage reducing circuit interfaced between the central base contacts of the light bulb and its cooperating lampholder socket, comprising: a generally disc-like, open centered mounting base of insulator material formed with an annular cavity recessed inwardly of its upper face, a laminated contact assembly mounted within the confines of said cavity and extending transversely across the central opening of said base, said assembly comprising a pair of identical, parallel spaced, registeringly superposed and substantially planar, electrically conductive plate contacts formed with oppositely off-set areas in corresponding marginal portions thereof and which define an intervening mounting socket in assembly, a sheet insulator extending between and electrically separating said plate contacts, and a silicon rectifier chip mounted in said socket and having upper and lower faces soldered to substantial opposing facial portions of said off-set areas; an annular mounting gasket of high temperature thermo-plastic resilient foam material mounted coaxially over and joined to the upper side of said base and contact assembly, and thermal setting adhesive means coating the upper face of said gasket for bonding the device to the base end of the light bulb in surrounding relation with the central base contact thereof whereby the latter operationally extends through the open center of said gasket for engagement with a central area of the uppermost of said plate contacts; a central area of the lowermost of said plate contacts being exposed for corresponding operational engagement with the lampholder's central base contact.

18. The device of claim 17, characterized by said adhesive coating being of a type curable to form a permanent bond when subjected to the ambient temperatures of the lampholder socket.

19. The device of claim 17, in which said contact plates are of brass or copper foil having a thickness of substantially 0.004 inches, and said insulator has a thickness of substantially 0.002 inches.

20. The device of claim 17, in which said chip is formed as a rectangular parallelopiped substantially 0.010 inches thick.

21. The device of claim 17, further characterized as providing a ½ sine wave rectification circuit.

22. The device of claim 17, characterized by said base and gasket being of self-extinguishing materials useful at temperatures in the order of 200° C.

23. The device of claim 17, characterized by the positioning of said chip remotely of the central areas of engagement between said base contacts and said plate contacts.

* * * * *